UNITED STATES PATENT OFFICE.

HUGO MOCK, OF ST. PAUL, MINNESOTA, ASSIGNOR, BY MESNE ASSIGN-MENTS, TO WILLIAM A. ALBRECHT AND ARTHUR C. DAVENPORT, OF ST. PAUL, MINNESOTA.

INK-ERADICATOR.

SPECIFICATION forming part of Letters Patent No. 716,567, dated December 23, 1902.

Application filed November 1, 1900. Renewed September 26, 1902. Serial No. 125,009. (No specimens.)

*To all whom it may concern:*

Be it known that I, HUGO MOCK, of St. Paul, Ramsey county, State of Minnesota, have invented certain new and useful Improvements in Ink-Eradicators, of which the following is a specification.

The object of the invention is to provide an ink-eradicator preferably in the form of a paste that can be conveniently and quickly applied to the hands of persons accustomed to use ink and who are thus liable to get ink upon their hands.

Another object of the invention is to provide an ink-eradicator that can be used conveniently and quickly for removing ink-marks from paper and other substances without injury to such substance.

The invention consists generally in a new composition of material hereinafter described, and particularly pointed out in the claims.

In carrying out my invention I take chlorid of lime, sodium carbonate, and magnesium carbonate. I first mix chlorid of lime with water in the proportion of three parts of chlorid of lime to fifteen parts of water. As the chlorid of lime is not completely soluble in water, there will be a residue, which is then filtered off, or the solution is removed by decantation or other suitable process. With this solution is mixed one and one-half parts of sodium carbonate, which precipitates all the calcium in the solution as calcium carbonate, leaving sodium hypochlorite and sodium chlorid in the solution. The precipitate and solution are together then mixed with about four parts of magnesium carbonate to form a paste of the desired consistency. The paste thus formed will keep indefinitely, largely owing to the presence of the magnesium carbonate, and the compound thus formed constitutes an effective ink-eradicator consisting only of a single article, easily applied, and which is much more convenient for use than any other known ink-eradicator.

The separation of the sodium chlorid from the sodium hypochlorite is based on the different solubilities of sodium chlorid and sodium hypochlorite in water. On concentrating the mixed solution of the two salts the sodium chlorid separates out first and the sodium hypochlorite remains in solution. Owing to the fact that boiling the solution would decompose the sodium hypochlorite the concentration and subsequent crystallization of the sodium chlorid must take place in one of two ways—either by spontaneous evaporation in the open air or by evaporation in a low temperature under reduced pressure. The latter I consider the preferable method. The presence of the magnesium carbonate in the ink-eradicator tends to prevent the decomposition of the sodium hypochlorite.

This ink-eradicator is designed mainly for use upon the hands for the purpose of removing ink-stains therefrom. It may, however, be used for removing ink-marks from paper or other substances. As the paste is not absorbed by the paper, there is no injury to the paper from its use, and a very effective and convenient ink-eradicator is thereby produced. The proportions hereinbefore specified may be varied without departing from my invention.

I claim as my invention—

1. An ink-eradicator, comprising sodium hypochlorite, magnesium carbonate, and water, in the proportions substantially as hereinbefore specified.

2. An ink-eradicator, consisting of sodium hypochlorite, sodium chlorid, calcium carbonate, magnesium carbonate, and water, in substantially the proportions hereinbefore specified.

In witness whereof I have hereunto set my hand this 29th day of October, 1900.

HUGO MOCK.

In presence of—
A. C. PAUL,
RICHARD PAUL.